Patented Apr. 12, 1949

2,467,148

UNITED STATES PATENT OFFICE 2,467,148

OIL INSOLUBLE LUBRICANT

Arnold J. Morway, Clark, and David W. Young, Roselle, N. J., assignors to Standard Oil Development Company, a corporation of Delaware No Drawing. Application March 27, 1947, Serial No. 737,716

6 Claims. (Cl. 252—29)

This invention relates to an oil insoluble lubricant and particularly to a grease type lubricant suitable for use on moving parts of machinery which are in contact with hot mineral oil, hydrocarbon solvents, chlorinated solvents, commercial acids and alkalies, water, and emulsions of various types.

In certain types of equipment and machinery used for manufacturing various products, such as synthetic alcohols, solvents, and the like, from hydrocarbon materials, it is not always possible to use ordinary mineral oil lubricants or mineral oil and soap compounded lubricants because the latter tend to be dissolved and abstracted from bearings and other surfaces, that unavoidably come into contact with the synthetic solvents, thus leaving such bearings and related surfaces unlubricated or inadequately protected.

In equipment such as pumps for hydrocarbons or acids, and in valves, glands, and the like, particular difficulty has been encountered in the past. The problem arises wherever an active fluid comes in contact with the lubricant, and if such fluid is acidic or alkaline, it may react with the soaps in greases to destroy or adulterate such soaps and thus ruin the lubricants.

We have found that it is possible to provide a lubricating composition for use in equipment of the general character described above which is not adversely affected by the hydrocarbons, acids, alkali solutions, and other materials being used or handled.

It is an object of our invention to compound an effective lubricant which is not particularly soluble or subject to being thinned out, washed away, or changed chemically or physically by mineral oils, organic acids, chlorinated hydrocarbons, emulsions, alcohols, and the like.

We have found that by using a combination of a suitable carbon black and a copolymer of a diolefin and/or a triolefin and acrylonitrile, for example, butadiene and acrylonitrile, it is possible to produce a grease having the aforesaid desirable characteristics. The carbon black employed must be one which is capable of forming a grease structure in combination with the polymer.

Specifically, we have found that a composition consisting essentially of about 12% of acetylene black and 88% of an oily diolefin-acrylonitrile type polymer can be prepared by simply mixing until a smooth grease-like consistency is obtained. The polymer is preferably a copolymer consisting of about 76% by weight of butadiene and 24% acrylonitrile. This copolymer is an oil having a viscosity of about 70 S. S. U. at 210° F. to 1800 S. S. U. at 210° F. It has a flash point of about 460° F. and an A. S. T. M. slope, over the range 100° F. to 210° F. from 0.35 to 0.50.

In lieu of butadiene-acrylonitrile polymers, however, we can make these oils from isoprene-acrylonitrile, or 2-3 di-methyl butadiene 1-3 and acrylonitrile. Myrcene and acrylonitrile, alloocimene and acrylonitrile, or 2-methyl pentadiene and acrylonitrile, etc., may be used in lieu of the first mentioned polymer. In general, the oily composition consists of a copolymer of acrylonitrile usually composing less than half of the copolymer. Triolefins may also be used.

As indicated above, the products should be insoluble in mineral oils, acids, and related compositions. We have found that a composition consisting of the ingredients such as those named above produces a smooth grease having a desirable penetration number between 275 and 300 by the A. S. T. M. method. However, softer or harder consistencies may be obtained by varying the quantity of acetylene carbon black employed. Other carbon blacks, such as those channel blacks which have structural characteristics, may be employed as the thickener, in lieu of or in addition to acetylene black, but they are generally harder to mix and give a somewhat less satsifactory grease structure.

The fluid copolymer preferred is a new type low molecular weight butadiene-acrylonitrile product which is liquid at temperatures as low as +20 to −70° F. This material is not soluble in natural rubber, GR-S rubber, butyl rubber, polyisobutylene, polyethylene, or polybutadiene, and for this reason it can be used as a hydraulic fluid. This copolymer per se, and a preferred method of preparing it, are described in detail in a copending application, Serial No. 637,782, filed December 28, 1945, by P. K. Frolich, B. W. Vanderbilt, and M. W. Swaney.

Briefly, as described in much greater detail in said application Serial No. 637,782, a liquid, low molecular weight polymer may be obtained from conjugated diolefins, such as butadiene, isoprene, piperylene, dimethyl butadiene, methyl pentadiene, or the like, and from mixtures of a major proportion of such conjugated diolefins with a minor proportion of an unsaturated comonomer, such as styrene, alpha methyl styrene, alpha methyl paramethyl styrene, halogenated styrenes, e. g. chlorinated or brominated styrene, acrylonitrile, methacrylonitrile, acrylic and methacrylic acid esters, such as ethyl fumerate, and unsaturated ketones such as methyl vinyl ketone and methyl isopropyl ketone under properly controlled conditions.

The properly controlled conditions required are one or more of the following:

(1) Use of a relatively high concentration, at least 3% and preferably more, up to not more than 12%, by weight, based on the monomers, of an aliphatic mercaptan type polymerization modifier, such as mercaptans of combined chain length of at least 5 carbon atoms. The tertiary mercaptans are preferred, especially the $C_8$ mercaptan prepared from diisobutylene, but the secondary and primary mercaptans may be used. It is preferred not to use mercaptans having more than 16 carbon atoms in the chain and if primary mercaptans are used, the chain length should not be greater than $C_{12}$.

(2) For emulsification, a highly unsaturated fatty acid should be used, such as linseed or soybean oil, in preparing the soap. The preferred quantity of emulsifier is 0.25 to about 5% by weight and the polymerization catalyst about 0.1 to 1%, based on the monomers.

Polymerization temperatures may be as low as 25° C. to as high as 60–70° C., the range of 35–40° C. being preferred for the oily copolymer of butadiene and acrylonitrile. It is advantageous to utilize polymerization promoters such as low molecular weight amines, alkali ferricyanides, inorganic cyanides and the like, in which cases the temperatures can be lowered substantially.

Thus, a sirupy oil was produced by charging into a rotatable pressure bottle the following charge:

| | Parts |
|---|---|
| Butadiene | 74 |
| Acrylonitrile | 26 |
| Water | 200 |
| Sodium soap of tallow acids | 3.6 |
| Free tallow acids | 0.4 |
| Diisobutylene mercaptan | 4 |
| $K_2S_2O_8$ | 0.3 |
| Morpholine | 0.1 |

The ingredients were kept at a temperature of 25° C. and rotated 16½ hours. The reaction was then stopped by means of 0.5% of 2,6-dibutyl-4-methyl phenol. An oily layer of liquid copolymer was obtained, conversion being 74%. When isoprene was substituted for butadiene, it required 21 hours at 26° C. to obtain a 77% conversion. This product was somewhat more viscous than the butadiene-acrylonitrile copolymer.

In hydraulic systems cured rubber, either natural or synthetic, is commonly used to connect metal conduits, tubes, pumps and the like. Compositions based on diolefin-acrylonitrile polymers have the very important advantage that they will not attack such rubber connections. In such compositions carbon black may be reduced to as little as 1%.

Our composition is stable also to rather high temperatures, showing no change at temperatures as high as 150° to 212° F. At 250° F. the copolymer tends to show slight changes in viscosity after a period of from three days to about fourteen days. At 300° F. the copolymer oil is stable for four hours, at least.

Thus, over an ordinary temperature range, the oily copolymer appears to be entirely satisfactory in stability and, in fact, it appears to be more stable in moderately high temperatures than castor oil.

If it is required in some special high temperature work to have an oil that is quite stable at 300° F. for days, we have found that we can hydrogenate the butadiene-acrylonitrile oil to form a saturated product that will show no change in viscosity or color or flash point, etc., even when held for a number of days at 300° to 400° and even up to 450° F.

The fluid copolymer as described in the copending application of Frolich et al. mentioned above, which is used in our improved lubricant, preferably is produced by the polymerization of a mixture of 76% butadiene and 24% acrylonitrile, this being about the preferred composition, although percentages may be varied widely. The lower limit appears to be about 18% acrylonitrile in the copolymer. The practical upper limit is as much as 80% acrylonitrile in the copolymer. The best range appears to be about from 24% acrylonitrile up to 45% acrylonitrile in the copolymer. As described in the copending application mentioned above, the copolymer preferably has an intrinsic viscosity of 0.05 to 0.4.

Polymerization is best effected by the emulsion method and mercaptans are used to control the extent of the polymerization and to reduce the over-all molecular weight growth. These mercaptans are added at appropriate times to stop further polymerization by poisoning the reaction. In our tests, a similar copolymer obtained by mass polymerization of the same composition was found to be unsatisfactory for use in a grease. When compounded with acetylene black in the same manner as described above, after a relatively short period of exposure to air, the mass polymerization product became a dry, tough, hard, and non-lubricating material entirely unsatisfactory for the purposes described above.

In the past, hydrocarbon-insoluble greases have sometimes been prepared from an alkali soap thickened castor oil. These lubricants, however, were water soluble and also were subject to disintegration in the presence of various acids and alkalies, although their oil insolubility characteristics were fairly satisfactory. Another grease has been proposed for hydrocarbon and acid service consisting of castor oil thickened with acetylene black. This product gives excellent service under some conditions but castor oil is soluble to some extent in aromatic hydrocarbons and alkalies and cannot be used where these are present in quantity. Thus, a grease containing 12% acetylene black and 88% castor oil was tested by shaking it occasionally with aviation gasoline containing some aromatic constitutents over a period of eight hours. It gradually disintegrated, resulting in the carbon black settling out of the castor oil.

When a preferred composition of our invention, namely, a composition of about 12% acetylene black and 88% of the oily di- or triolefin and acrylonitrile copolymer, was shaken with aviation gasoline, no dissolving effect was indicated. Other tests showed our improved composition to be unaffected by the actions of the usual dilute or concentrated mineral acids.

Tests show that the composition of our present invention is superior to prior art compositions designed for lubricating moving parts in the presence of mineral oils, organic and inorganic acids, and the like, particularly in their resistance to disintegration. Certain so-called structural blacks of smaller particle size than acetylene black, namely, some of the channel blacks which have recently been shown to be effective in combination with mineral oil for producing grease compositions, may similarly be used with the liquid copolymer as suggested above. Generally, they are somewhat less effective than acetylene black as grease structure agents and larger quantities may be required. The carbon black content may be varied from about 10% to 20%, for greases, depending upon the particular type of carbon black employed. Mixtures of acetylene and other carbon blacks may be used, as suggested above, and under some conditions it may be desirable to employ a non-structural black in combination with a structural black, although normally such will not be required. The liquid copolymer will generally constitute from 80 to 90% of the finished product.

It will be understood that the structure blacks mentioned hereinabove as being suitable for compounding lubricants are different from the conventional forms of carbon which have been widely used commercially in lubricants in the past. The latter which comprise graphite, lampblack, and the relatively large size particulate channel carbon blacks form only suspensions in oils, whereas the structure blacks form a colloidal composition of good stability. The difference appears to be due largely to the physical structure and arrangement of the carbon black particles. In the case of acetylene black, there is a definite reticulate structure. Particles, generally spherical in shape and having an average diameter of about 45 millimicrons, appear to be connected together in long chains to produce a structure similar to alkali soap fibrils. They form an interlocking reticulate network structure apparently which holds the oil in place in a very stable manner. Acetylene black is easily deflocculated and hence is easily dispersed in oil by ordinary means, such as a mixing type grease kettle.

The common channel blacks, on the other hand, are less readily deflocculated and dispersed in oil. A special apparatus, such as a paint roller mill, or equivalent means, is normally required to effect a satisfactory dispersion. The channel blacks tend to form particulate (relatively spherical) structures rather than reticulate structures and are, therefore, somewhat less effective as thickening agents. Thus, while about 11 or 12% of acetylene black in polymer oil gives a grease of good consistency, about 18% by weight of channel black would be required to produce a similar consistency with the same oil. In general, the particle size of the structure black runs between 40 and 50 millimicrons for acetylene black and between 15 and 40 millimicrons for the channel black.

It will be understood that our invention includes compositions containing various additional ingredients in small quantities. Thus, there may be included small quantities of oiliness agents, extreme pressure agents, antioxidants such as phenyl alpha naphthylamine, di-tertiary butyl para cresol, etc., and other like additives, as will be apparent to those skilled in the art.

While we prefer to use the particular copolymer described hereinabove, other butadiene and acrylonitrile copolymers having other percentage compositions of acrylonitrile and butadiene may be found useful for certain specific purposes. Also, as pointed out above, other copolymers composed of various percentages of various diolefins with acrylonitrile, such as isoprene, 2-3 dimethyl butadiene 1-3, myrcene, allo-ocimene, 2-methyl pentadiene and the like may be employed. As a general rule the percentage of acrylonitrile will run between 15 and 50% of the copolymer, although it may run as high as 80% in exceptional cases.

When used for purposes such as hydraulic fluids, the oils may be used with smaller quantities of carbon blacks, from 10% to as little as 1% being useful in most cases.

By the term "structure black" as used herein, we refer primarily to acetylene carbon black which produces a grease structure in lubricating oils. The term also applies secondarily to other carbon blacks, such as certain channel blacks which exhibit the same tendency to a marked degree.

We claim:
1. A lubricating composition consisting essentially of 1 to 20% of acetylene black and 80 to 99% of an oily acrylonitrile-diolefin type copolymer composed of 76 to 55% by weight of diolefin of 4 to 12 carbon atoms and 24 to 45% of acrylonitrile, said copolymer being produced by copolymerization at a temperature of 25° to 70° C. in the presence of an aliphatic mercaptan having not less than 5 and not more than 16 carbon atoms per molecule, said copolymer having an intrinsic viscosity of between 0.05 and 0.4.

2. An oil insoluble lubricant consisting essentially of 12% acetylene black and 88% of an oily copolymer composed of 76% to 55% by weight of butadiene and 24% to 45% of acrylonitrile, said polymer being produced by copolymerization at a temperature of 25° to 70° C. in the presence of an aliphatic mercaptan having not less than 5 and not more than 16 carbon atoms per molecule, said copolymer having an intrinsic viscosity between 0.05 and 0.4.

3. A lubricating composition consisting essentially of 80% to 90% by weight of an oily copolymer prepared from about 76% by weight of butadiene and 24% acrylonitrile copolymerized in the presence of an aliphatic mercaptan of 5 to 16 carbon atoms at a temperature between 25° and 70° C., and 10 to 20% carbon black, a major part of said carbon black being acetylene black.

4. A lubricating composition consisting essentially of 10 to 20% of carbon black, a major part of which is acetylene black, and 80 to 90% by weight of an oily copolymer composed of about 76% by weight of butadiene and about 24% of acrylonitrile copolymerized in the presence of an aliphatic mercaptan having 5 to 16 carbon atoms at a temperature between 25° and 70° C.

5. A composition consisting of 80 to 99% of a diolefin-acrylonitrile type copolymer of low molecular weight which is prepared by copolymerization of 85 to 50% by weight of diolefin of 4 to 12 carbon atoms with 15 to 50% of acrylonitrile in the presence of an aliphatic mercaptan having 5 to 16 carbon atoms per molecule and at a temperature between 25° and 70° C. and which is liquid at temperatures as low as +20° F., and 20 to 1% of carbon black, the major part of which is a grease-structure forming carbon black having a particle size between 15 and 50 millimicrons.

6. A hydraulic fluid consisting essentially of an oily diolefin-acrylonitrile copolymer composed of 15 to 50% acrylonitrile and 85 to 50% of a diolefin having 4 to 12 carbon atoms, said copolymer being produced by copolymerization at a temperature between 25° and 70° C. in the presence of diisobutyl mercaptan, and 1 to 10% by weight of acetylene carbon black, based on the total composition.

ARNOLD J. MORWAY.
DAVID W. YOUNG.

REFERENCES CITED

The following references are of record in the file of this patent:

UNITED STATES PATENTS

| Number | Name | Date |
|---|---|---|
| 2,125,851 | Ralston | Aug. 2, 1938 |
| 2,349,058 | Swenson | May 16, 1944 |
| 2,382,803 | Miller | Aug. 14, 1945 |

FOREIGN PATENTS

| Number | Country | Date |
|---|---|---|
| 17,288 | Great Britain | 1913 |